(12) United States Patent
Namii

(10) Patent No.: US 8,922,634 B2
(45) Date of Patent: Dec. 30, 2014

(54) IMAGE PICKUP APPARATUS AND IMAGE PICKUP APPARATUS SYSTEM

(71) Applicant: Olympus Medical Systems Corp., Tokyo (JP)

(72) Inventor: Yasushi Namii, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 9 days.

(21) Appl. No.: 13/774,286

(22) Filed: Feb. 22, 2013

(65) Prior Publication Data

US 2013/0235174 A1    Sep. 12, 2013

Related U.S. Application Data

(63) Continuation of application No. PCT/JP2012/063757, filed on May 29, 2012.

(30) Foreign Application Priority Data

Aug. 24, 2011    (JP) .................................. 2011-182730

(51) Int. Cl.

| A62B 1/04 | (2006.01) |
|---|---|
| A61B 1/04 | (2006.01) |
| H04N 7/18 | (2006.01) |
| G03B 11/00 | (2006.01) |
| G03B 17/17 | (2006.01) |
| G03B 35/08 | (2006.01) |
| H04N 5/225 | (2006.01) |
| H04N 5/232 | (2006.01) |
| G02B 23/24 | (2006.01) |

(52) U.S. Cl.
CPC .................. *H04N 7/18* (2013.01); *G03B 11/00* (2013.01); *G03B 17/17* (2013.01); *G03B 35/08* (2013.01); *H04N 5/2254* (2013.01); *H04N 5/23212* (2013.01); *G02B 23/2415* (2013.01); *G02B 23/2423* (2013.01); *G02B 23/2484* (2013.01); *H04N 5/2258* (2013.01); *H04N 2005/2255* (2013.01)

USPC ................................................. 348/65; 348/45

(58) Field of Classification Search
None
See application file for complete search history.

(56) References Cited

U.S. PATENT DOCUMENTS

| 8,672,838 B2 | 3/2014 | McDowall | |
|---|---|---|---|
| 2011/0157350 A1* | 6/2011 | Yamamoto | ...................... 348/79 |

FOREIGN PATENT DOCUMENTS

| JP | 09-116807 | 5/1997 |
|---|---|---|
| JP | 2003-078802 | 3/2003 |
| JP | 2005-109623 | 4/2005 |

(Continued)

*Primary Examiner* — Joseph Ustaris
*Assistant Examiner* — Zhubing Ren
(74) *Attorney, Agent, or Firm* — Kenyon & Kenyon LLP

(57) ABSTRACT

An image pickup apparatus includes: an objective optical system for focusing a bundle of light rays from an object into an image; an image sensor placed in the vicinity of the image-forming position of the objective optical system; a dividing element placed between the objective optical system and the image sensor and used for dividing a bundle of light rays from the objective optical system into reflected and transmitted bundles of light rays; a first reflection member for reflecting back the bundle of light rays reflected by the dividing element; and a second reflection member for reflecting the bundle of light rays transmitted by the dividing element, wherein the bundle of light rays reflected by the first reflection member via the dividing element is focused to form an image on a first area of the image sensor, and the bundle of light rays reflected by the second reflection member is focused to form an image on a second area of the image sensor, the second area of the image sensor being different from the first area of the image sensor.

14 Claims, 11 Drawing Sheets

(56) References Cited

FOREIGN PATENT DOCUMENTS

| | | |
|---|---|---|
| JP | 2007-228259 | 9/2007 |
| JP | 2010-068241 | 3/2010 |
| JP | 2010-220890 | 10/2010 |
| JP | 2012-133311 | 7/2012 |

* cited by examiner

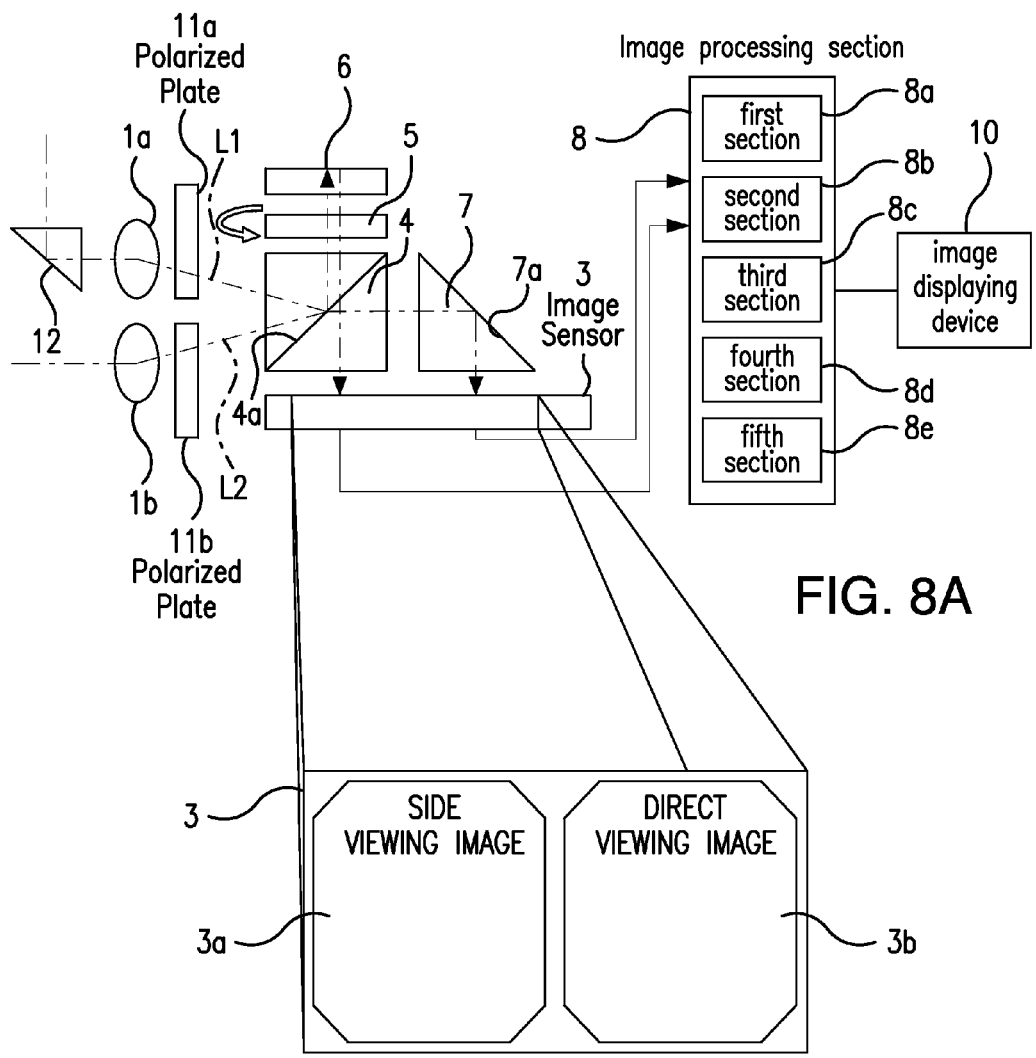

US 8,922,634 B2

IMAGE PICKUP APPARATUS AND IMAGE PICKUP APPARATUS SYSTEM

This application claims benefits of Japanese Application No. 2011-182730 filed in Japan on Aug. 24, 2011, the contents of which are incorporated herein by reference.

BACKGROUND OF THE INVENTION

1. Field of the Invention

This invention relates to an image pickup apparatus having a deep focal depth and an image pickup apparatus system which are preferable for endoscopic observations for example.

2. Description of Related Art

Conventional image pickup apparatuses include an image pickup apparatus the focal depth of which is expanded by selecting an image with good contrast from two images that are different in focus position to combine the selected images.

As one example of such conventional image pickup apparatuses, as in disclosed in Japanese Patent Kokai No. Hei. 09-116807 and Japanese Patent Kokai No. 2003-078802 respectively for example, there are image pickup apparatuses in which one bundle of light rays is divided into two bundles of light rays by a half prism and two image sensors capturing images formed by the two divided bundles of light rays respectively are placed with the lengths of the optical paths of the two bundles of rays to the image sensors made to differ from each other so that the focus positions at which the two images are formed on the image sensors respectively are different from each other.

FIG. 11 is a view schematically showing a structure of the image pickup apparatus disclosed in Japanese Patent Kokai No. Hei. 09-116807.

The image pickup apparatus disclosed in Japanese Patent Kokai No. Hei. 09-116807 is configured to have a structure in which: light traveling from an object 20 to be imaged is made to pass through an imaging lens 51 and then is divided into two bundles of light rays by a two division prism 52 to have two optical paths, the two division prism 52 being provided with a half mirror; one of the two divided bundles of light rays is imaged by an image sensor 53 that is placed at an image-forming position; and the other is received by an image sensor 54 that is placed to be slightly shifted from the image-forming position. Besides, in FIG. 11, the numeral reference 55 denotes a high pass filter, and the numeral reference 56 denotes an adder which adds to imaging output signals captured by the image sensor 53 high-frequency signals passing through the high pass filter 55 of imaging output signals captured by the image sensor 54.

FIG. 12 is a view schematically showing a structure of the image pickup apparatus disclosed in Japanese Patent Kokai No. 2003-078802.

The image pickup apparatus disclosed in Japanese Patent Kokai No. 2003-078802 is formed to have a structure in which: light traveling from an object 20 to be imaged is made to pass through an imaging lens 61 and then is divided into two bundles of light rays by a prism 62 to have two optical paths, the prism 62 having a half mirror structure; and the two divided bundles of light rays are imaged by image sensors 63 and 64 which are different from each other in depth of field and which are placed so that the rear depth of field of one of the image sensors 63 and 64 is equal to the front depth of field of the other. Besides, in FIG. 12, the numeral references 65 and 66 denote movement devices that move the image sensors 63 and 64 in the directions of the optical axes running respectively, respectively, the numeral reference 67 denotes an operation-processing device that calculates a distance from the imaging lens 61 to each of the image sensors 63 and 64, the numeral references 68 and 69 denote drive circuits that operate the movement devices 65 and 66 respectively, respectively, and the numeral reference 70 denotes an image-synthesizing device.

Also, as another example of such conventional image pickup apparatuses, for example, there is an image pickup apparatus in which a beam splitter is placed on one CCD and two images are formed on areas of the CCD different from each other, like an electronic endoscope which is disclosed in Japanese Patent Kokai No. 2004-313523.

FIG. 13 is a view schematically showing an inner structure of the front portion of an electronic endoscope provided with the image pickup apparatus disclosed in Japanese Patent Kokai No. 2004-313523.

In the image pickup apparatus disclosed in Japanese Patent Kokai No. 2004-313523, light traveling from an object 20 to be imaged (living tissue) is made to pass through an objective lens 71 and then is divided into two light bundles by a first prism 72 to have two optical paths, the first prism 72 including a beam splitter 72a, and light transmitted by the beam splitter 72a is reflected by a second prism 73 including a total reflection mirror 73a that totally reflects light transmitted by the beam splitter 72a. And then, light reflected by the beam splitter 72a is imaged by a light-receiving part 74a of a CCD 74 and the light reflected by the total reflection mirror 73a is imaged by a light-receiving section 74b of the CCD 74. Besides, in FIG. 13, the numeral reference 75 denotes an opening for illumination, and the numeral reference 76 denotes a light guide for guiding illumination light for illuminating the object 20.

In addition, as yet another example of such conventional image pickup apparatuses, like a fluorescence observation apparatus shown in FIGS. 5 and 6 of Japanese Patent Kokai No. 2010-220890 for example, there is an image pickup apparatus in which: an afocal bundle of light rays is formed at an intermediate part of an optical path; an optical-path dividing element is placed on the part of the optical path at which the afocal bundle of rays is formed, to divide the optical path; and positions of image-forming lenses on the divided optical paths are adjusted respectively or optical members are inserted on the optical paths respectively so that the lengths of the optical paths up to positions at which images are formed respectively are made to differ from each other, in order to form two images on one image sensor.

FIG. 14 is a view schematically showing a structure of the image pickup apparatus shown in FIG. 5 of Japanese Patent Kokai No. 2010-220890.

In the image pickup apparatus disclosed in Japanese Patent Kokai No. 2010-220890, light traveling from an object to be imaged is made to pass through an objective lens 81, light with a wavelength longer than exciting wavelength is reflected by a dichroic mirror 82 and white light the wavelength of which is shorter than the exciting wavelength is transmitted so that the light traveling from the object is divided into two bundles of light rays. In addition, the white light which is transmitted by the dichroic mirror 82 and the wavelength of which is shorter than the exciting wavelength is divided into two bundles of light rays by a half mirror 83. And, the light transmitted by the half mirror 83 is focused on the focal plane of an image sensor 88 by a condenser lens 85, and the light reflected by the half mirror 83 is reflected by a mirror 90 and is focused on a position that differs from the focal plane of the image sensor 88 by a condenser lens 86. Besides, in FIG. 14, the numeral reference 89 denotes an exciting light cut filter which cuts the exciting light of light reflected by the dichroic mirror 82, and the numeral reference 84 denotes a condenser lens by which light transmitted by the exciting light cut filter is focused on the focal plane of an image sensor 87.

SUMMARY OF THE INVENTION

An image pickup apparatus according to the present invention includes: an objective optical system for forming an image out of a bundle of light rays traveling from an object; an image sensor placed in a vicinity of an image-forming position of the objective optical system; a dividing element placed between the objective optical system and the image sensor and used for dividing the bundle of light rays traveling from the objective optical system into two bundles of light rays, which are a bundle of light rays reflected and a bundle of light rays transmitted; a first reflection member for reflecting back the bundle of light rays having been reflected by the dividing element; and a second reflection member for reflecting the bundle of light rays having been transmitted through the dividing element, wherein the bundle of light rays having been reflected by the first reflection member via the dividing element is focused to form an image on a first area of the image sensor, and the bundle of light rays having been reflected by the second reflection member is focused to form an image on a second area of the image sensor that is different from the first area of the image sensor.

Also, in an image pickup apparatus according to the present invention, it is preferred that: the dividing element is a polarizing beam splitter; a wave plate for changing a phase of the bundle of light rays having been reflected by the polarizing beam splitter is further placed between the polarizing beam splitter and the first reflection member; and the bundle of light rays having been reflected by the first reflection member via the wave plate and the polarizing beam splitter is focused on the first area of the image sensor, to form an image.

Also, in an image pickup apparatus according to the present invention, it is preferred that the wave plate is a $\lambda/4$ plate.

Also, in an image pickup apparatus according to the present invention, it is preferred that the bundle of light rays that forms an image on the first area of the image sensor and the bundle of light rays that forms an image on the second area of the image sensor are made to differ from each other in optical path length up to the image-forming position.

Also, an image pickup apparatus system according to the present invention includes an image pickup apparatus according to the present invention, and an image-selecting section that compares, with each other, the images respectively formed on the first area and the second area, from which to select an in-focus image to be displayed.

Also, in an image pickup apparatus according to the present invention, it is preferred that: the image sensor and the second reflection member are joined together in a vicinity of the second area; and the image sensor and the dividing element are joined together in a vicinity of the first area.

Also, in an image pickup apparatus according to the present invention, it is preferred that: the image sensor and the second reflection member are joined together in a vicinity of the second area; and the image sensor and the polarizing beam splitter are joined together in a vicinity of the first area.

Also, in an image pickup apparatus according to the present invention, it is preferred that a depolarization plate is placed on an objective-optical-system side of the polarizing beam splitter.

Also, an image pickup apparatus system according to the present invention includes: one of the above-described image pickup apparatus according to the present invention; and an image-processing section capable of adjusting at least one of: white balance, shift of a central position, image rotation, and magnification of each of the images respectively formed on the first area and the second area; and electronic shutter.

Also, in an image pickup apparatus according to the present invention, it is preferred that the wave plate is configured to be rotatable so that the images respectively formed on the first area and the second area have substantially equal brightness.

Also, in an image pickup apparatus according to the present invention, it is preferred that the image sensor reads out pixel information in a direction same as a direction in which the images respectively formed on the first area and the second area align.

Also, in an image pickup apparatus according to the present invention, it is preferred that a shutter method for the image sensor is a rolling shutter method in which a shutter operation is performed for each scan line.

Also, in an image pickup apparatus according to the present invention, it is preferred that: the objective optical system has a first optical path and a second optical path; and a polarization plate is placed on each of the first optical path and the second optical path so that the polarization plates makes a polarization direction of a bundle of light rays traveling on the first optical path perpendicular to a polarization direction of a bundle of light rays traveling on the second optical path.

Also, in an image pickup apparatus according to the present invention, it is preferred that the first optical path and the second optical path are optical paths for right eye and for left eye respectively, optical paths for direct viewing and for side viewing respectively, or optical paths for white light and for fluorescence respectively.

Also, an image pickup apparatus system according to the present invention includes: an objective optical system for forming an image out of a bundle of light rays traveling from an object; an image sensor placed in a vicinity of an image-forming position of the objective optical system; and a dividing and image-forming system for dividing a bundle of light rays traveling from the objective optical system into a first image and a second image which differ from each other in focal position and for forming the first image and the second image as divided on areas different from each other on the image sensor, respectively, wherein the image sensor reads out pixel information in a direction same as a direction in which the images respectively formed on the first area and the second area of the image sensor align, the image pickup apparatus system further includes an image-selecting section, the image-selecting section comparing, with each other, the images respectively formed on the first area and the second area as read out as pixel information by the image sensor, and then selecting an in-focus image, from the images respectively formed on the first area and second area, as an image to be displayed, and the image selected by the image-selecting section is synthesized.

Also, in an image pickup apparatus system according to the present invention, it is preferred that a shutter method for the image sensor is a rolling shutter method in which a shutter operation is performed for each scan line.

Also, in an image pickup apparatus system according to the present invention, it is preferred that: the dividing and image-forming system includes a dividing element for dividing a bundle of light rays into two bundles of light rays, which are a reflected bundle of light rays and a transmitted bundle of light rays; and the reflected bundle of light rays and the transmitted bundle of light rays are reflected by reflection members at least once, to respectively form images on the areas different from each other on the image sensor.

Also, in an image pickup apparatus system according to the present invention, it is preferred that: the dividing and image-forming system includes a polarizing beam splitter placed between the objective optical system and the image sensor and used for dividing a bundle of light rays traveling from the objective optical system into two bundles of light rays, which are a bundle of light rays reflected and a bundle of light rays transmitted, a wave plate for changing a phase of the bundle of light rays having been reflected by the polarizing beam splitter, a first reflection member for reflecting back the bundle of light rays having been transmitted by the wave plate, and a second reflection member for reflecting the bundle of light rays having been transmitted by the polarizing beam splitter; and the bundle of light rays having been reflected by the first reflection member via the wave plate and the polarizing beam splitter is focused, to form an image on the first area of the image sensor, and the bundle of light rays having been reflected by the second reflection member is focused, to form an image on the second area of the image sensor that is different from the first area of the image sensor.

The features and advantages of the present invention will become apparent from the following detailed description of the preferred embodiments when taken in conjunction with the accompanying drawings.

BRIEF DESCRIPTION OF THE DRAWINGS

FIG. 1A is a view schematically showing the whole structure of the image pickup apparatus system, and FIG. 1B is a view showing orientations of an object in images formed on first and second areas on an image sensor respectively.

FIG. 3A is a view showing one example of structures of the image-selecting section, and FIG. 3B is a view showing another example of structures of the image-selecting section.

FIG. 5A is a view conceptually showing a difference between the lengths of the optical paths of bundles of light rays into which light is divided, for the image pickup apparatus disclosed in Japanese Patent Kokai No. 2004-313523, and FIG. 5B is a view conceptually showing a difference between the lengths of the optical paths of bundles of light rays into which light is divided, for the image pickup apparatus of the embodiment 1 of the present invention.

FIG. 6A is a view showing one variation example of the image pickup apparatuses, FIG. 6B is a view showing another variation example of the image pickup apparatuses, and FIG. 6C is a view showing yet another variation example of the image pickup apparatuses.

FIG. 7A is a view schematically showing the whole structure of the image pickup apparatus system, and FIG. 7B is a view showing kinds of images formed on first and second areas on an image sensor respectively.

FIGS. 8A and 8B are explanatory views showing a structure of an image pickup apparatus system according to an embodiment 3 of the present invention, FIG. 8A is a view schematically showing the whole structure of the image pickup apparatus system, and FIG. 8B is a view showing kinds of images formed on first and second areas on an image sensor respectively.

FIG. 9A is a view schematically showing the whole structure of the image pickup apparatus system, and FIG. 9B is a view showing kinds of images formed on first and second areas on an image sensor respectively.

FIG. 10A is a view showing one example of the methods, and FIG. 10B is a view showing another example of the methods.

DETAILED DESCRIPTION OF THE PREFERRED EMBODIMENTS

Embodiment 1

Figure 1A:
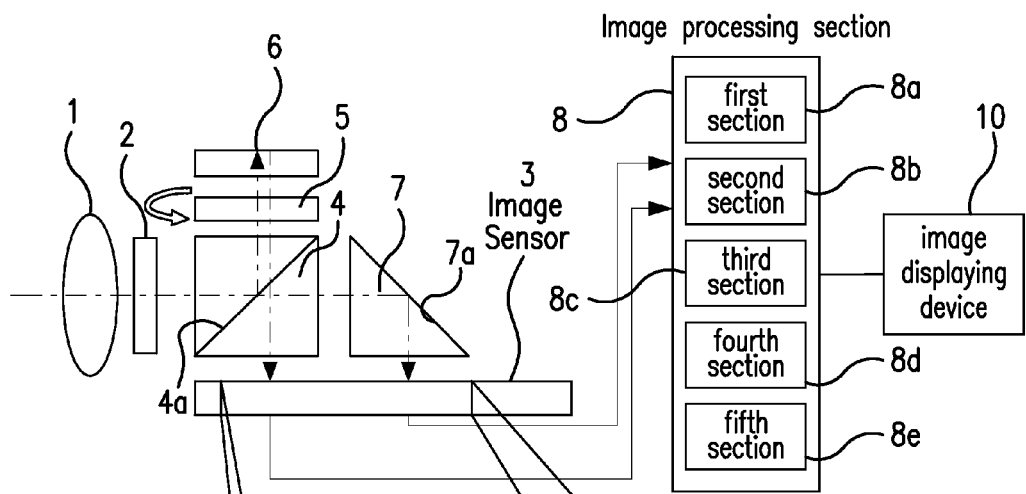
FIGS. 1A and 1B are explanatory views showing a structure of an image pickup apparatus system according to an embodiment 1 of the present invention.

The image pickup apparatus system of the embodiment 1 includes an objective lens 1, a depolarization plate 2, an image sensor 3, a polarizing beam splitter 4, a wave plate 5, a first reflection member 6, a second reflection member 7, and an image-processing section 8, as shown in FIG. 1A. In FIG. 1A, the numeral reference 10 denotes an image-displaying device.

The objective lens 1 has a function which is to focus a bundle of light rays traveling from an object into an image, and the objective lens 1 is formed to be telecentric on the image side.

The depolarization plate 2 is placed between the objective lens 1 and the polarizing beam splitter 4.

The image sensor 3 is composed of a CMOS sensor or a CCD sensor and is placed in the vicinity of an image formation position of the objective lens 1. In the case where the image sensor 3 is composed of a CMOS sensor, the rolling shutter method in which a shutter operation is performed in each scan line or the global shutter method may be used as a shutter method for the image sensor 3. Also, the image sensor 3 is formed to read image information out in the same direction as a direction in which images on first and second areas 3a and 3b align, the direction being shown in FIG. 1B.

The polarizing beam splitter 4 is located on the optical path between the objective lens 1 and the image sensor 3, is arranged above the first area 3a on the image sensor 3, and divides a bundle of light rays from the objective lens 1 into two bundles of light rays that are a reflected bundle of light rays and a transmitted bundle of light rays respectively, through a plane 4a of the polarizing beam splitter. Besides, in this case, the polarizing beam splitter 4 reflects linearly polarized light of an S-polarized component and transmits linearly polarized light of a P-polarized component.

The wave plate 5 is composed of a λ/4 plate and is formed to be capable of rotating on the optical axis.

The first reflection member 6 is composed of a mirror, and the first reflection member 6 reflects a bundle of light rays that is reflected by the plane 4a of the polarizing beam splitter and then transmitted by the wave plate 5, so that the bundle of light rays reflected by the plane 4a and then transmitted by the wave plate 5 is made to retrace its path.

The second reflection member 7 is composed of a prism and reflects light transmitted by the polarizing beam splitter 4, through its total reflection plane 7a. Besides, the total reflection plane 7a of the prism 7 may be given mirror coating to become a reflection surface.

And, in the image pickup apparatus system of the embodiment 1, a bundle of light rays reflected by the first reflection member 6 via the wave plate 5 and the polarizing beam splitter 4 is focused to form an image on the first area 3a of the image sensor 3. On the other hand, a bundle of light rays reflected by the second reflection member 7 is focused to form an image on the second area 3b of the image sensor 3, the second area 3b being different from the first area 3a.

The image-processing section 8 is joined to the image sensor 3, is provided for a central processing section which is omitted in the drawings, and includes a first image-processing section 8a1, a second image-processing section 8a2, a third image-processing section 8a3, a fourth image-processing section 8a4, and a fifth image-processing section 8a5.

Figure 4:
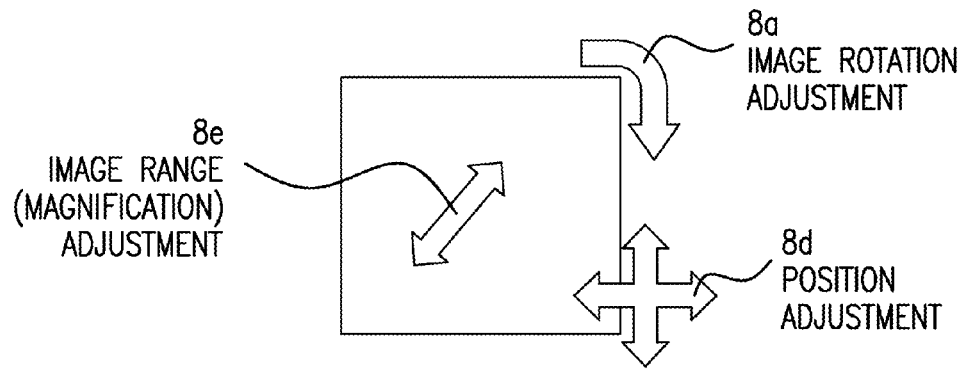
FIG. 4 is an explanatory view conceptually showing a part of image processing which is performed by an image-processing section in the image pickup apparatus system shown in FIGS. 1A and 1B.

The first image-processing section 8a is formed to correct the orientations (rotations) of images formed on the first and second areas 3a and 3b respectively, as shown in FIG. 4.

Figure 1B:
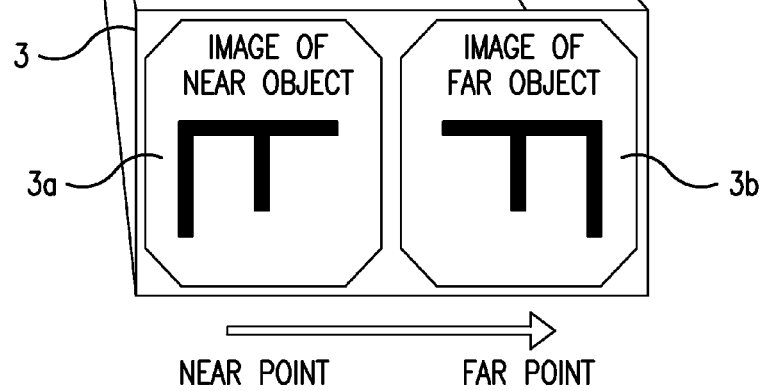
Figure 2:
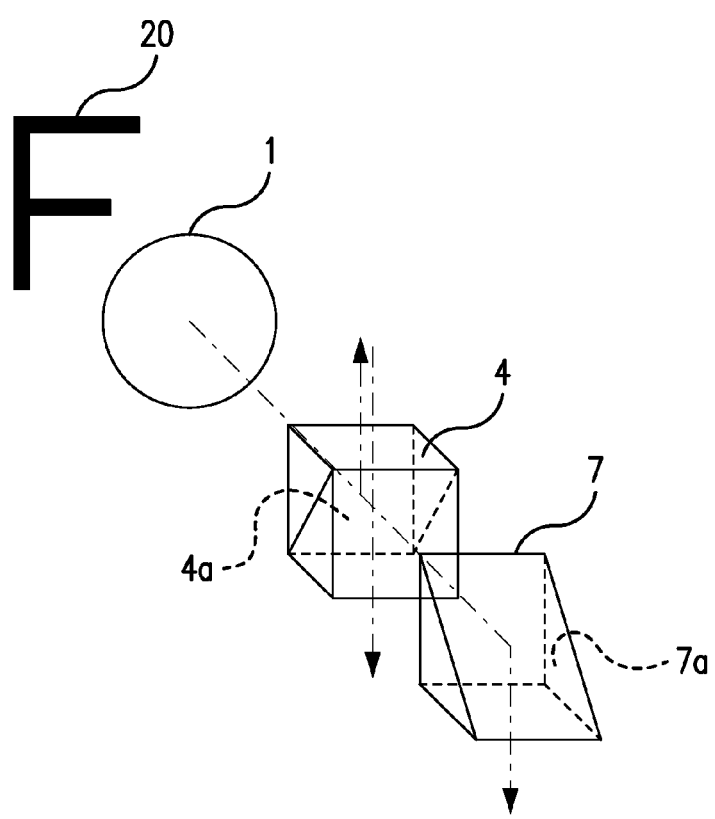
FIG. 2 is a perspective view showing an objective optical system, a dividing element, and a second reflection member for the image pickup apparatus system shown in FIGS. 1A and 1B.

In the case where the letter "F" as shown in FIG. 2 is observed for example, its images formed on the first and second areas 3a and 3b respectively have such orientations as shown in FIG. 1B, respectively. That is to say, the image formed on the first area 3a has an orientation obtained when the letter "F" rotates 90 degrees clockwise on the central point of the first area 3a and then rotates 180 degrees on the vertical axis in FIG. 1B passing through the central point of the first area 3a. Also, the image formed on the second area 3b has an orientation obtained when the letter "F" rotates 90 degrees clockwise on the central point of the second area 3b.

Accordingly, in the case where the images formed on the first and second areas 3a and 3b respectively are displayed on the image-displaying device 10, the images formed on the first and second areas 3a and 3b respectively are rotated 90 degrees counterclockwise on the central points of the first and second areas 3a and 3b respectively, through the first image-processing section 8a. In addition, the image formed on the first area 3a is rotated 180 degrees on the vertical axis in FIG. 1B passing through the central point of the first area 3a so as to correct that mirror image.

The third image-processing section 8c is formed to be capable of adjusting white balance of each of images formed on the first and second areas 3a and 3b respectively The fourth image-processing section 8d is formed to be capable of moving (selecting) the central point of each of images formed on the first and second areas 3a and 3b respectively, as shown in FIG. 4.

The fifth image-processing section 8e is formed to be capable of adjusting a display range (magnification) for each of images formed on the first and second areas 3a and 3b respectively, as shown in FIG. 4.

The second image-processing section 8b corresponds to an image-selecting section for the present invention and is formed to operate in such a way that: the second image-processing section 8b compares images on the first and second areas 3a and 3b which are read out as pixel information by the image sensor 3, with each other; and then the second image-processing section 8b selects from these images an image that is in focus, as an image to be displayed.

Figure 3A:
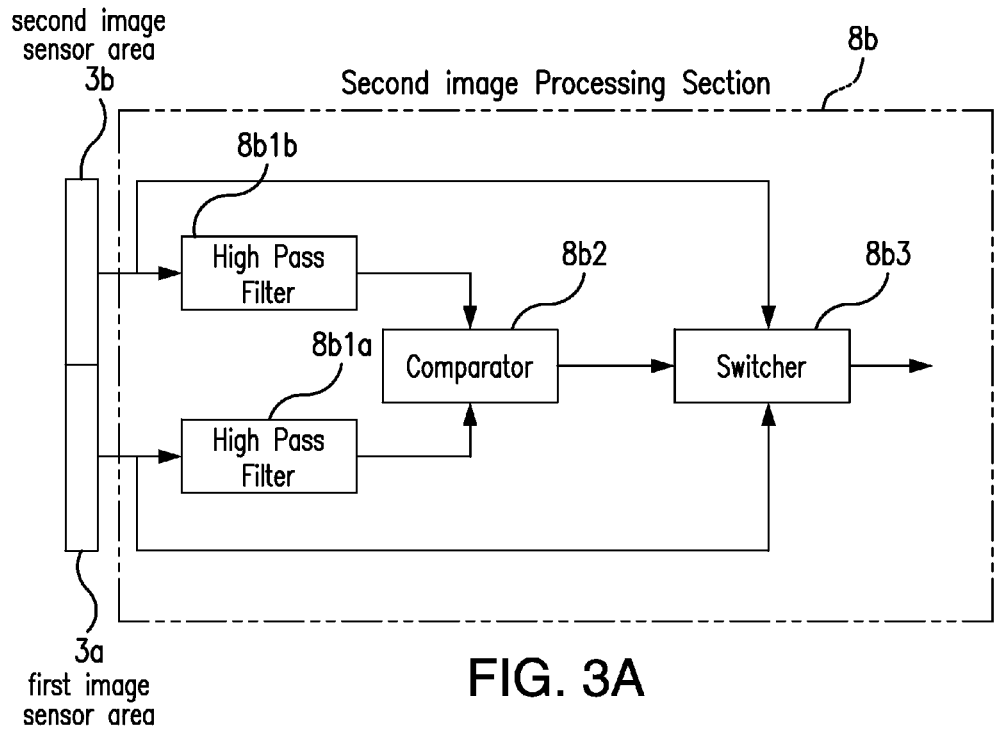
FIGS. 3A and 3B are explanatory views showing examples of structures of an image-selecting section in the image pickup apparatus system shown in FIGS. 1A and 1B.

In the detailed explanation, as shown in FIG. 3A for example, the second image-processing section 8b includes high pass filters 8b1a and 8b1b joined to the first and second areas 3a and 3b respectively, a comparator 8b2 joined to the high pass filters 8b1a and 8b1b, and a switcher 8b3 joined to the comparator 8b2 and to the first and second areas 3a and 3b. And, high-frequency components of the images formed on the first and second areas 3a and 3b respectively are extracted by the high pass filters 8b1a and 8b1b, the extracted high-frequency components are compared with one another by the comparator 8b2, and the switcher 8b3 selects an image the number of the high frequency components of which is larger.

Figure 3B:
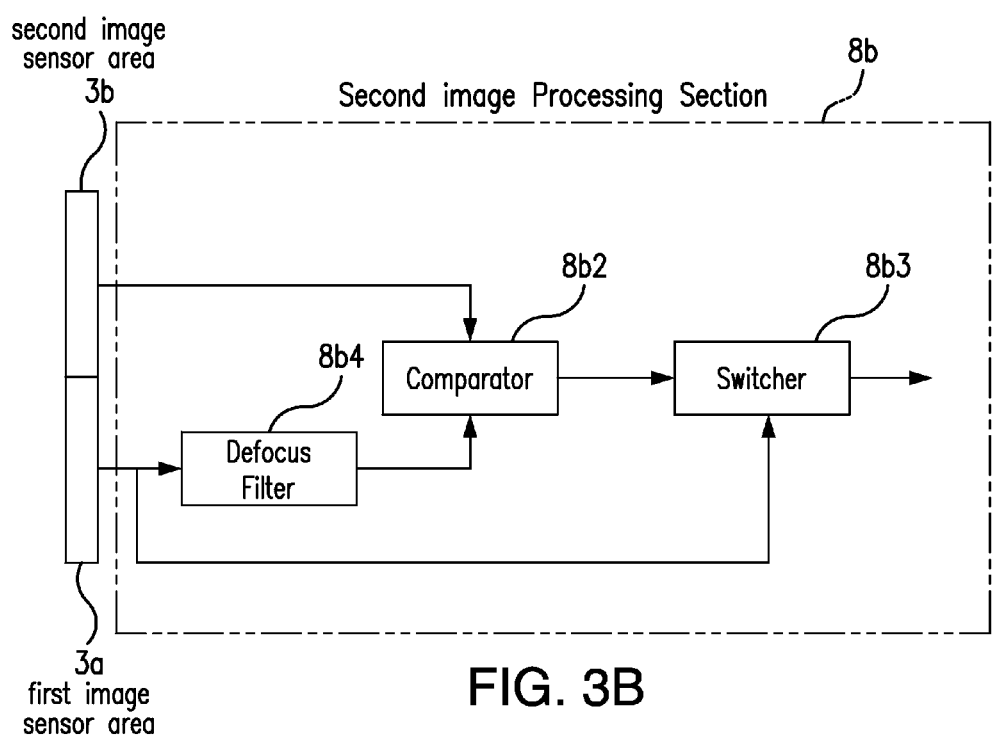

Also, as shown in FIG. 3B for example, the second image-processing section 8b may include a defocus filter 8b4 joined only to the first area 3a, a comparator 8b2 joined to the defocus filter 8b4 and to the second area 3b, and a switcher 8b3 joined to the first area 3a and to the comparator 8b2 and may be formed to operate in such a way that: an image signal from the first area 3a which is defocused by the defocus filter 8b4 is compared with an image signal from the second area 3b which is not defocused, by the comparator 8b2; and the switcher 8b3 selects the image formed on the second area 3b for a part in which the two image signals corresponds to each other, and the switcher 8b3 selects the image formed on the first area 3a for a part in which the two image signals do not correspond to each other.

The image-displaying device 10 includes a displaying area which displays an image selected by the second image-processing section 8b. Besides, the image-displaying device 10 may include displaying areas which display images formed on the first and second areas 3a and 3b respectively.

In the image pickup apparatus system of the embodiment 1 having such a structure, a bundle of light rays traveling from the objective lens 1 passes through the depolarization plate 2 and then enters the polarizing beam splitter 4 without the bias against its polarization directions. The light incident on the polarizing beam splitter 4 is divided into linearly polarized light of an S-polarized component and linearly polarized light of a P-polarized component, through the plane 4a of the polarizing beam splitter 4.

The bundle of rays of the linear polarized light of the S-polarized component which is reflected by the plane 4a of the polarizing beam splitter 4 passes through the λ/4 plate 5 to be converted into circularly polarized light, and then is reflected by the mirror 6. The bundle of light rays reflected by the mirror 6 passes through the λ/4 plate 5 again, is made to convert from circularly polarized light into linearly polarized light of a P-polarized component, enters the polarizing beam splitter 4 again, is transmitted by the plane 4a of the polarizing beam splitter 4, and then forms an image on the first area 3a on the image sensor 3.

Also, the bundle of rays of the linear polarized light of the S-polarized component which is transmitted by the plane 4a of the polarizing beam splitter 4 after passing through the objective lens 1 and the depolarization plate 2 and then entering the polarizing beam splitter 4 is reflected by the total reflection plane 7a of the prism 7, and then forms an image on the second area 3b on the image sensor 3.

The image sensor 3 reads image information out in the direction shown by an arrow in FIG. 1B (or, in the same direction as a direction in which images formed on the first and second areas 3a and 3b respectively align).

Images which are formed on the first and second areas 3a and 3b respectively and which are read out as pixel information by the image sensor 3 are compared with each other by the second image-processing section 8b, and then the second image-processing section 8b selects from these images an image which is in focus, as an image to be displayed.

Besides, images selected by the second image-processing section 8b are combined to be displayed on the image-displaying device 10.

Figure 5A:
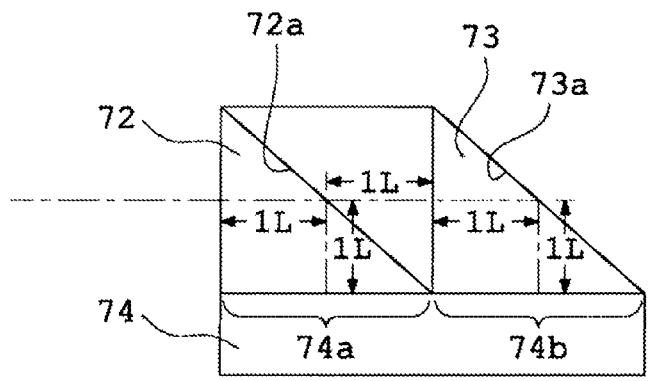
FIGS. 5A and 5B are explanatory views showing a difference between the lengths of the optical paths of bundles of light rays into which light is divided, while the image pickup apparatus of the embodiment 1 of the present invention is being compared with the image pickup apparatus disclosed in Japanese Patent Kokai No. 2004-313523.
Figure 5B:
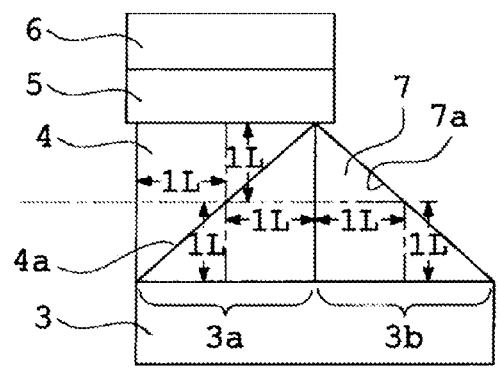

Now, characteristic constitutions of and operation effects of the image pickup apparatus system of the embodiment 1 are explained using FIGS. 5A and 5B, while the characteristic constitutions of and the operation effects of the image pickup apparatus system of the embodiment 1 are being compared with those of conventional image pickup apparatus systems.

When the length of the optical path on which light is reflected by a beam splitter 72a after entering a prism 72 to be imaged by a light-receiving part 74a of an image sensor 74 has a value of 2L (=1L+1L) in the conventional image pickup apparatus disclosed in Japanese Patent Kokai No. 2004-313523, as shown in FIG. 5A, the length of the optical path on which light is transmitted by the beam splitter 72a after entering the prism 72 and then reflected by a total reflection mirror 73a to be imaged by a light-receiving part 74b of the image sensor 74 is to have a value of 4L (=1L+1L+1L+1L). As a result, a difference between the length of the optical path from an objective lens to the light-receiving part 74a of the image sensor 74 and the length of the optical path from the objective lens to the light receiving part 74b of the image sensor 74 has a value of 2L and becomes too large. As a result, in the case where the lengths of the optical paths in the range of the focal depths in the light-receiving part 74a range from 2L−L$_a$ to 2L+L$_a$ and the lengths of the optical paths in the range of the focal depths in the light-receiving part 74b range from 4L−L$_b$ to 4L+L$_b$, a length of an optical path that is out of the ranges of the focal depths with which images are formed on the light receiving parts 74a and 74b respectively inevitably exists in the range between the maximum value 2L+L$_a$ of the lengths of the optical paths in the range of focal depths with which images are formed on light-receiving part 74a and the minimum value 4L−L$_b$ of the lengths of the optical paths in the range of focal depths with which images are formed on light-receiving part 74b. As a result, a blurred image inevitably occurs between images of objects at a near point and a far point.

On the other hand, in the image pickup apparatus system of the embodiment 1, as shown in FIG. 5B, a bundle of light rays entering the polarizing beam splitter 4 from the objective-lens side and then reflected by the plane 4a of the polarizing beam splitter 4 is made to retrace its path by the mirror 6 as a first reflection member to pass through the λ/4 plate 5 as a wave plate more than one time so that the polarization direction of linearly polarized light is changed by 90 degrees, the object lens being not shown in FIG. 5B. And then, that bundle of light rays is transmitted by the plane 4a of the polarizing beam splitter 4 and enters the first area 3a of the image sensor 3. Accordingly, the length of the optical path from the incidence plane of the polarizing beam splitter 4 to the first area 3a of the image sensor 3 has a value of 4L (=1L+1L+1L+1L) if the thickness of the λ/4 plate 5 is not taken into consideration. Also, a bundle of light rays entering the polarizing beam splitter 4 from the objective-lens side and then transmitted by the plane 4a of the polarizing beam splitter 4 is reflected by the total reflection plane 7a of the prism 7 as a second reflection member and then enters the second surface 3b of the image sensor 3, the objective lens being not shown in FIG. 5B. As a result, the length of the optical path from the incidence plane of the polarizing beam splitter 4 to the second area 3b of the image sensor 3 also has a value of 4L (=1L+1L+1L+1L).

That is to say, in the image pickup apparatus system of the embodiment 1, a bundle of light rays traveling from the objective lens 1 is divided into two bundles of light rays by the polarizing beam splitter 4 as a dividing element, and then light reflected by the dividing element 4 is made to retrace its path by the reflection member 6 and is transmitted by the dividing element 4 to form an image on the first area 3a of the image sensor 3. As a result, it is sufficient to merely make the optical paths of bundles of light rays which form images on the first and second areas 3a and 3b of the image sensor 3 respectively have the approximately same length or to make a slight difference between the lengths of the optical paths of the light rays which form images on the first and second areas 3a and 3b of the image sensor 3 respectively. Now, in the case where the lengths of the optical paths in the range of the focal depths in the first area 3a range from 4L−L$_1$ to 4L+L$_1$ and the lengths of the optical paths in the range of the focal depths on the second area 3b range from 4L−L$_2$ to 4L+L$_2$, it is possible to control a difference between the lengths of the optical paths of light bundles which form images on the first and second areas 3a and 3b respectively so that the maximum value 4L+L$_1$ of the rear focal depth of the length of the optical path of the light bundle which forms an image on one area (the first area) is equal to or larger than the minimum value 4L−L$_2$ of the front focal depth of the length of the optical path of the light bundle which forms an image on the other area (the second area). Accordingly, in the image pickup apparatus of the embodiment 1, it is possible to form two images on one image sensor without making a large difference between the focal positions of the two images, and it is possible to expand a focal depth in the continuous range.

Besides, in order to make a smaller difference between the lengths of the optical paths of light bundles which form images on the first and second areas 3a and 3b respectively, the thickness of the λ/4 plate 5 or a difference between the refractive indices of the polarizing beam splitter 4 and the prism 7 only has to be adjusted to be formed.

Also, in the image pickup apparatus system of the embodiment 1, not only a polarizing beam splitter as a dividing element 4 but also the wave plate 5 is used, so that the polarization direction of a bundle of light rays reflected by the polarizing beam splitter 4 is changed by 90 degrees, through the wave plate 5. As a result, the brightness of an image formed on the first area 3a can be kept approximately equal to the brightness of an image formed on the second area 3b. And, the bundle of light rays reflected by the polarizing beam splitter 4 is made to retrace its path by the first reflection member 5 while using a λ/4 plate as a wave plate 5, so that the polarization direction of the bundle of light rays is changed by 90 degrees. As a result, an image can be formed on the image sensor 3 efficiently without losing most of the brightness of a bundle of light rays.

Besides, in the case where the there is no necessity that brightness of two images formed on the first and second areas 3a and 3b respectively is taken into consideration, a half mirror may be used as a dividing element 4.

Also, in the image pickup apparatus system of the embodiment 1, the second image-processing section 8b as an image-selecting section compares images formed on the first and second areas 3a and 3b respectively with each other after these images is read out as pixel information by the image sensor 3, and then the second image-processing section 8b selects from these images an image which is in focus, as an image to be displayed. As a result, an image with a deep depth of focus can be obtained in a continuous range, so that an object image with a deep depth of field can be observed in a continuous and wide range through the image-displaying device 10.

Also, in the image pickup apparatus system of the embodiment 1, the image sensor 3 is made to read pixel information out in the same direction as a direction in which images formed on the first and second areas 3a and 3b respectively align. As a result, a predetermined process, such as a comparison between the images with respect to an extent with which each image is in focus through the image-selecting section 8b, can be performed for each pixel information which is read out by the image sensor 3, in each pixel. As a result, it is possible to secure simultaneous acquisition of information on the two images, as compared with a manner in which pixel information on the whole of each of two images formed on the first and second areas 3a and 3b respectively is read out separately from each other and then the above-described predetermined process is performed after finishing reading out the whole of the pixel information on each of the images.

Also, the image pickup apparatus system of the embodiment 1 includes the first image-processing section 8a, and the orientation (rotation) of each of two images formed on the first and second areas 3a and 3b respectively can be adjusted in the image pickup apparatus system of the embodiment 1. As a result, it is possible to display the two images with the two images having the same orientation. Also, it is also possible to correct an amount of a rotation of each of the two images through the first image-processing section 8a, the rotation of each of the two images being caused by manufacturing errors in manufacturing prisms or the like. As a result, there is no necessity that the image pickup apparatus system of the present invention is provided with a mechanically adjusting mechanism for the prism for correcting orientations of images. Accordingly, it is possible to downsize the whole size of the image pickup apparatus system, and it is also possible to reduce manufacturing costs.

Also, the image pickup apparatus system of the embodiment 1 includes the third image-processing section 8c, so that it is possible to adjust white balance of each of two images formed on the first and second areas 3a and 3b respectively in the case where a difference between the colors of these two images occurs due to manufacturing errors in coating optical systems.

Also, the image pickup apparatus system of the embodiment 1 includes the fourth image-processing section 8d and the fifth image-processing section 8e. As a result, in the case where the central position of or a magnification of an image formed on the first area 3a is not equal to that of an image formed on the second area 3b respectively due to assembly errors or manufacturing errors in assembling or manufacturing prisms 7 or polarizing beam splitters 4, it is possible to correct a difference between the positions of the two images or a difference in magnification between the two images by adjusting the central positions or display areas.

Besides, it is more preferable that the image pickup apparatus system of the embodiment 1 further includes an image-processing section (omitted in the drawings and) capable of adjusting a speed of the electronic shutter for each of images formed on the first and second areas 3a and 3b respectively. As a result, the brightness of each of the two images formed on the first and second areas 3a and 3b can be adjusted by adjusting the speed of the electronic shutter.

Also, in the image pickup apparatus system of the embodiment 1, the λ/4 plate 5 is formed to be capable of rotating on the optical axis, so that it is possible to adjust a polarization state of a bundle of light rays by rotating the λ/4 plate 5 so that an amount of the bundle of light rays transmitted by the polarizing beam splitter 4 to enter the first area 3a can be adjusted. As a result, it is possible to easily adjust a difference in brightness between the two images formed on the first and second areas 3a and 3b respectively, the difference in brightness being caused by manufacturing errors in manufacturing optical systems.

Also, in the image pickup apparatus system of the embodiment 1, the objective lens 1 is formed to be telecentric on the image side, so that a principal ray incident on the image sensor 3 becomes approximately parallel to the optical axis of the objective lens 1. As a result, it is hard for a difference in magnification to occur, even though focal positions of two images formed by light bundles incident on the first and second areas 3a and 3b respectively differ from each other. As a result, it is possible to control an amount of magnification adjusted by the fifth image-processing section 8e, and it is possible to obtain good images.

Besides, in the case where a bundle of light rays traveling from the object 20 to pass through the objective lens 1 contains polarization components the polarization directions of which are biased (for example, the bundle of light rays contains only P-polarized components), an amount of a bundle of light rays reflected by the polarizing beam splitter 4 considerably differs from an amount of a bundle of light rays transmitted by the polarizing beam splitter 4 if the image pickup apparatus system does not include the depolarization plate 2. As a result, when two images formed on the first and second areas 3a and 3b are compared with each other by the image-selecting section 8a2, parts of these images which are in focus are selected, and then the whole image is synthesized using the selected parts of the images which are in focus, the brightness of the composite whole image varies with the selected parts of the images, which may be obstacle in observation.

On the other hand, the image pickup apparatus system of the embodiment 1 includes the depolarization plate 2, so that polarization directions of a bundle of light rays having passed through the objective lens 1 can be randomized by making the bundle of light rays pass through the depolarization plate 2 even though the bundle of light rays has polarization components the polarization directions of which are biased. As a result, two images formed on the first and second areas 3a and 3b can be made to have the substantially equal brightness. As a result, when two images formed on the first and second areas 3a and 3b respectively are compared with each other by the image-selecting section 8a2, parts of these images which are in focus are selected, and then a whole image is synthesized using the selected parts of the images, it is possible to obtain a whole image having uniform brightness regardless of whether each of the selected parts of the images is formed on the first area 3a or the second area 3b.

Figure 6A:
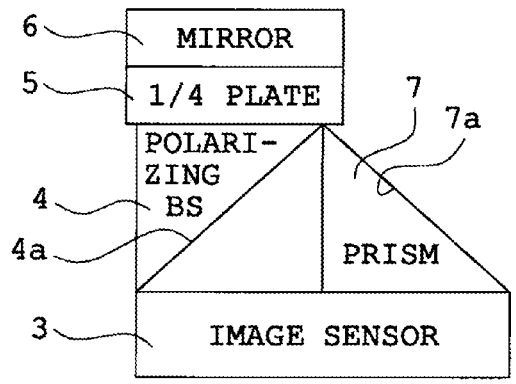
FIGS. 6A, 6B, and 6C are explanatory views schematically showing variation examples of image pickup apparatuses for the image pickup apparatus system shown in FIGS. 1A and 1B.

Also, in one example of variations of the image pickup apparatus system of the embodiment 1, the first reflection member 6, the λ/4 plate 5, the polarizing beam splitter 4, the second reflection member 7, and the image sensor 3 may be integrated with one another, as shown in FIG. 6A.

As a result, such an image pick up apparatus system does not require any mechanic frame for holding the polarizing beam splitter 4 or the prism 7 as a second reflection member. Accordingly, it is possible to lower manufacturing costs all the more.

Figure 6B:
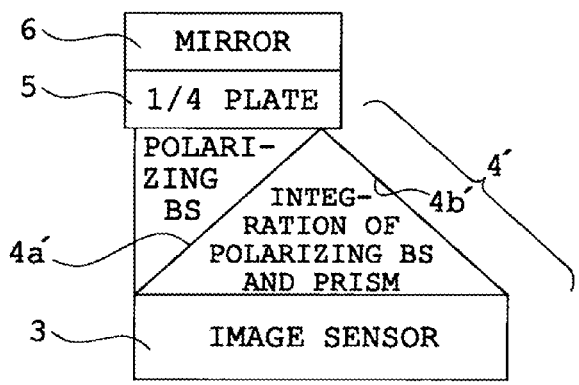

Also, in another example of variations of the image pickup apparatus system of the embodiment 1, the image pickup apparatus system of the another example may be provided with an optical member 4' into which a polarizing beam splitter and a prism as a second reflection member are formed integrally with each other, instead of the polarizing beam splitter 4 and the second reflection member 7, as shown in FIG. 6B. Besides, a numeral reference 4a' shown in FIG. 6B denotes a polarizing beam splitter plane, and a numeral reference 4b' shown in FIG. 6B denotes a total reflection plane.

As a result, it is possible to reduce the number of optical parts. Accordingly, it is possible to lower manufacturing costs all the more.

Besides, in the case where an objective lens 1 is formed to be telecentric on the image side as in the image pickup apparatus system of the embodiment 1, the diameter of a bundle of light rays passing through the polarizing beam splitter 4 becomes lager than that of a bundle of light rays passing through the prism 7 as a second reflection member, so that the polarizing beam splitter 4 easily becomes larger than the prism 7. In addition, the λ/4 plate 5 which is placed on the optical path on the reflection side of the polarizing beam splitter 4 is thick as described above, so that the length of the optical path of light incident on the first area 3a becomes longer than that of the optical path of light incident on the second area 3b.

Accordingly, in order to make a smaller difference between the length of the optical path of light incident on the first area 3a and the length of the optical path of light incident on the second area 3b, it is desirable that the polarizing beam splitter 4 is made to have a larger refractive index than the prism 7 dose. Also, glass materials having low refractive indices, such as S-BSL made by OHARA. INC and plastic materials, may be used for the prism 7. In addition, it is desirable that: an image at the near point-side focal position of the objective lens 1 is formed on the first area 3a; and an image at the far point-side focal position of the objective lens 1 is formed on the second area 3b.

As a result, it is possible to reduce a difference between the lengths of the optical paths of light incident on the first area 3a and the length of the optical path of light incident on the second area 3b due to the size of the polarizing beam splitter 4 or the thickness of the λ/4 plate 5.

Figure 6C:
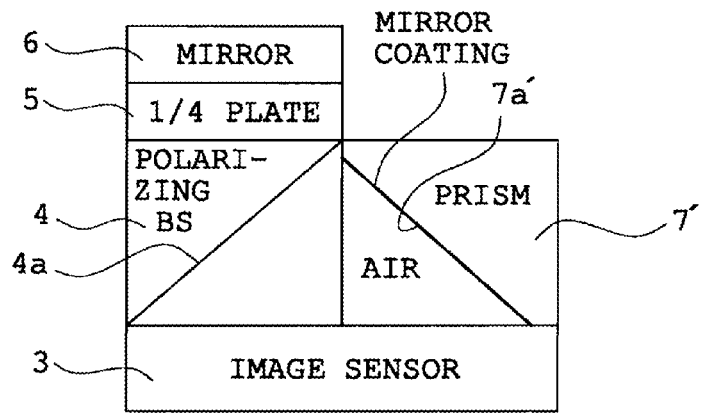

In addition, in another example of variations of the image pickup apparatus system of the embodiment 1, as shown in FIG. 6C, a second reflection member may be composed of a prism 7' the incidence-side plane 7a' of which is given mirror coating to become a reflection plane.

As a result, a medium through which the optical path of a bundle of light rays reflected by the incidence-side plane 7a' (reflection plane) of the prism 7' after being transmitted by the polarizing beam splitter 4 and then forming an image on the second area 3b passes is composed of air, and it is possible to use a refractive index that is yet smaller than that of the polarizing beam splitter 4, so that it is possible to make a yet smaller difference between the lengths of the optical paths of light bundles incident on the first and second areas 3a and 3b respectively, as described above.

Besides, in the case where the optical paths of the bundles of light rays incident on the first and second areas 3a and 3b respectively are made to have the approximately same length, as well as extending the depth of focus in a continuous range, it is possible to perform observations as explained in the following embodiments 2 to 4 using images formed on these two areas respectively while the whole of the image pickup apparatus is being prevented from having a large size.

Embodiment 2

Figure 7A:
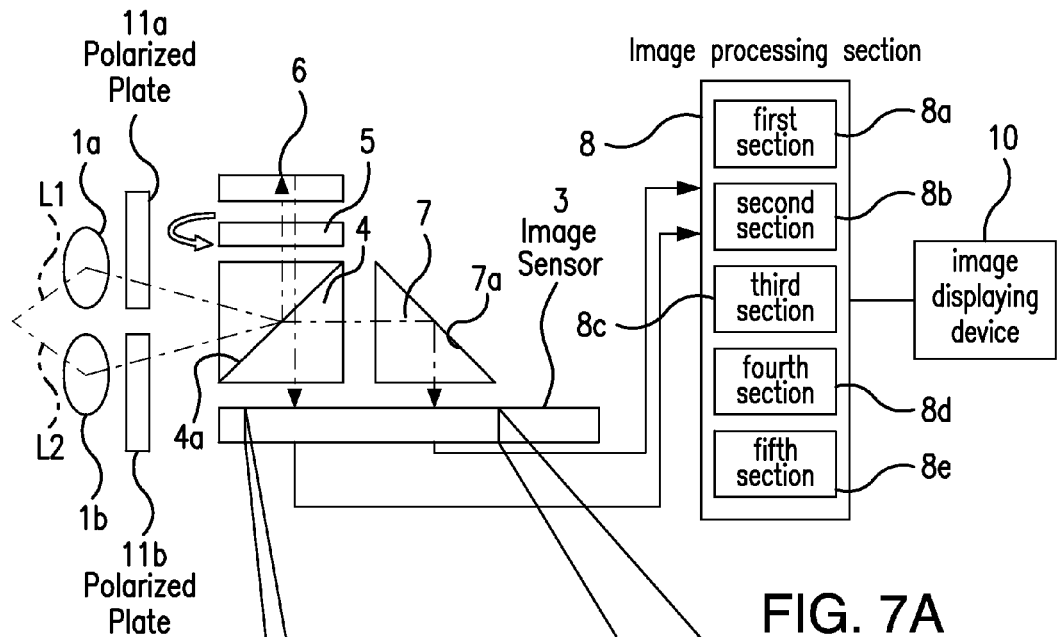
FIGS. 7A and 7B are explanatory views showing a structure of an image pickup apparatus system according to an embodiment 2 of the present invention.

In an image pickup apparatus system of an embodiment 2, as shown in FIG. 7A, an objective optical system includes optical paths L1 and L2 which are used for right and left eyes respectively (an optical path L1 for right eye and an optical path L2 for left eye are shown in FIG. 7A), and objective lenses 1a and 1b for right and left eyes for stereoscopic observation are placed on the first and second optical paths L1 and L2 respectively (an objective lens 1a for right eye and an objective lens 1b for left eye are shown in FIG. 7A). Also, polarized plates 11a and 11b by which the polarization direction of a bundle of light rays traveling on the optical path passing through the objective lens 1a is made to become perpendicular to the polarization direction of a bundle of light rays traveling on the optical path passing through the objective lens 1b are placed on the optical paths L1 and L2 respectively.

Figure 7B:
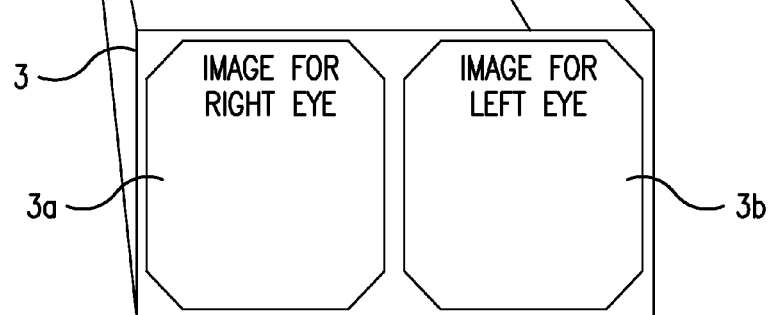

Also, the refractive indices of the polarizing beam splitter 4 and the prism 7 are adjusted so that the optical paths of light bundles incident on the first and second areas 3a and 3b respectively hardly differ from each other in length and the optical paths have the approximately the same length, the first and second areas 3a and 3b being shown in FIG. 7B.

Also, an image-processing section 8 is provided with a publically-known image-synthesizing section (which is omitted in the drawings and) which combines an image for right eye formed on the first area 3a and an image for left eye formed on the second area 3b.

The other constitutions for the embodiment 2 are the approximately same as those of the image pickup apparatus system of the embodiment 1.

In the image pickup apparatus system of the embodiment 2 having such a structure, bundles of light rays traveling from the objective lenses 1a and 1b for right and left eyes respectively pass through the polarized plates 11a and 11b respectively to enter the polarizing beam splitter 4. At this point, the polarized plates 11a and 11b make the polarization directions of the bundles of light rays passing through the polarized plates 11a and 11b respectively perpendicular to each other. As a result, in the polarizing beam splitter 4, only a bundle of light rays traveling from one of the objective lenses (corresponding to the bundle of light rays for right eye traveling from the objective lens 1a in FIGS. 7A and 7B) is reflected by the plane 4a of the polarizing beam splitter, and only a bundle of light rays traveling from the other of the objective lenses (corresponding to the bundle of light rays for left eye traveling from the objective lens 1b in FIGS. 7A and 7B) is transmitted by the plane 4a of the polarizing beam splitter. Afterward, these bundles of light rays follow the same paths as in the embodiment 1 respectively, and then images for right and left eyes are formed on the first and second areas 3a and 3b respectively (an image for right eye is formed on the first area 3a and an image for left eye is formed on the second area 3b in FIGS. 7A and 7B).

The image pickup apparatus system of the embodiment 2 is formed to make the optical path of light incident on the first area 3a have the approximately same length as the optical path of the light incident on the second area 3b does, so that two right-side and left-side images for stereoscopic observation can be formed on the different areas 3a and 3b from each other on one image sensor 3. And, these two images are combined by the above-described and publically-known image synthesizing section (which is omitted in the drawings), so that a stereoscopic image can be observed on the image-displaying device 10.

Besides, in the example shown in FIGS. 7A and 7B, an image for right eye is formed on the first area 3a, and an image for left eye is formed on the second area 3b. However, the image for right eye may be formed on the second area 3b and the image for left eye may be formed on the first area 3a.

The other operation effects of the embodiment 2 are the approximately same as those of the image pickup apparatus system of the embodiment 1.

Embodiment 3

In an image pickup apparatus system of an embodiment 3, as shown in FIG. 8A, an objective optical system includes an optical path L1 for side viewing and an optical path L2 for direct viewing. An objective lens 1a for side viewing is placed on the optical path L1, and an objective lens 1b for direct viewing is placed on the optical path L2. A numeral reference 12 shown in FIG. 8A denotes an optical-path bending prism which reflects light from an object located on the lateral side and guides the light to the objective lens 1a. Also, polarized plates 11a and 11b by which the polarization direction of a bundle of light rays traveling on the optical path passing through the objective lens 1a is made to become perpendicular to the polarization direction of a bundle of light rays traveling on the optical path passing through the objective lens 1b are placed on the optical paths L1 and L2 respectively.

Also, the image-displaying device 10 includes displaying areas on which images formed on the first and second areas 3a and 3b respectively are displayed respectively, the first and second areas 3a and 3b being shown in FIG. 8B.

The other constitutions for the embodiment 3 are the approximately same as those of the image pickup apparatus system of the embodiment 1.

In the image pickup apparatus system of the embodiment 3 having such a structure, bundles of light rays traveling from the objective lenses 1a and 1b for side viewing and for direct viewing respectively pass through the polarized plates 11a and 11b respectively to enter the polarizing beam splitter 4. At this point, the polarized plates 11a and 11b make the polarization directions of the bundles of light rays passing through the polarized plates 11a and 11b respectively perpendicular to each other. As a result, only a bundle of light rays traveling from one of the objective lenses (corresponding to the bundle of light rays for side viewing traveling from the objective lens 1a in FIGS. 8A and 8B) is reflected by the plane 4a of the polarizing beam splitter, and only a bundle of light rays traveling from the other of the objective lenses (corresponding to the bundle of light rays for direct viewing traveling from the objective lens 1b in FIGS. 8A and 8B) is transmitted by the plane 4a of the polarizing beam splitter, in the polarizing beam splitter 4. Afterward, these bundles of light rays follow the same paths as in the embodiment 1 respectively, and then an image for side viewing is formed on the first area 3a and an image for direct viewing is formed on the second area 3b.

In the image pickup apparatus system of the embodiment 3, it is possible to form two images of a side-viewing image and a direct-viewing image on the first and second areas 3a and 3b on one image sensor 3 respectively, the first and second areas 3a and 3b being different from each other, so that it is possible to observe each of these images on the image-displaying device 10.

Besides, in the example shown in FIGS. 8A and 8B, an image for side viewing is formed on the first area 3a, and an image for direct viewing is formed on the second area 3b. However, the image for side viewing may be formed on the second area 3b and the image for direct viewing may be formed on the first area 3a.

The other operation effects of the embodiment 3 are the approximately same as those of the image pickup apparatus system of the embodiment 1.

Embodiment 4

Figures 9A, 9B:
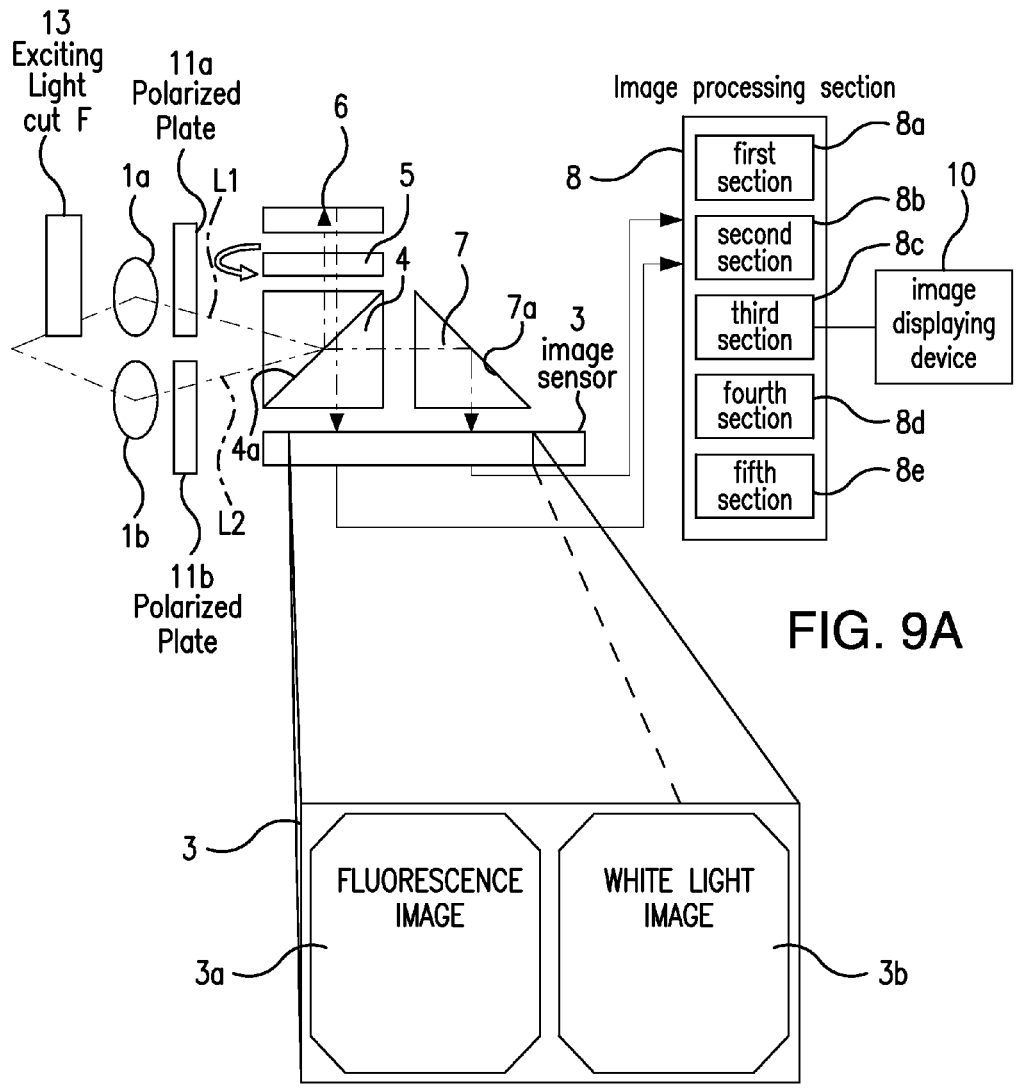
FIGS. 9A and 9B are explanatory views showing a structure of an image pickup apparatus system according to an embodiment 4 of the present invention.

In an image pickup apparatus system of an embodiment 4, as shown in FIG. 9A, an objective optical system includes an optical path L1 for fluorescence observation and an optical path L2 for white light observation. An objective lens 1a for fluorescence observation is placed on the optical path L1, and an objective lens 1b for white light observation is placed on the optical path L2. A numeral reference 13 shown in FIG. 9A denotes a barrier filter which transmits only fluorescence of light traveling from an object and cuts exciting light (or cuts both of exciting light and white light). Also, polarized plates 11a and 11b by which the polarization direction of a bundle of light rays traveling on the optical path passing through the objective lens 1a is made to become perpendicular to the polarization direction of a bundle of light rays traveling on the optical path passing through the objective lens 1b are placed on the optical paths L1 and L2 respectively.

Also, the image-displaying device 10 includes displaying areas on which images formed on the first and second areas 3a and 3b respectively are displayed respectively, the first and second areas 3a and 3b being shown in FIG. 9B.

In addition, the image-processing section 8 is preferably provided with a publically-known image-synthesis processing section (which is omitted in the drawings and) which combines a fluorescence image formed on the first area 3a and a white light image formed on the second area 3b, and the image-displaying device 10 preferably includes a displaying area on which a composite image from the fluorescence image and the white light image is displayed.

The other constitutions for the embodiment 4 are the approximately same as those of the image pickup apparatus system of the embodiment 1.

In the image pickup apparatus system of the embodiment 4 having such a structure, bundles of light rays traveling from the objective lenses 1a and 1b for fluorescence observation and for white light observation respectively pass through the polarized plates 11a and 11b respectively to enter the polarizing beam splitter 4. At this point, the polarized plates 11a and 11b make the polarization directions of the bundles of light rays passing through the polarized plates 11a and 11b respectively perpendicular to each other. As a result, only a bundle of light rays traveling from one of the objective lenses (corresponding to the bundle of light rays for fluorescence observation traveling from the objective lens 1a for fluorescence observation in FIGS. 9A and 9B) is reflected by the plane 4a of the polarizing beam splitter, and only a bundle of light rays traveling from the other of the objective lenses (corresponding to the bundle of light rays for white light observation traveling from the objective lens 1b for white light observation in FIGS. 9A and 9B) is transmitted by the plane 4a of the polarizing beam splitter, in the polarizing beam splitter 4. Afterward, these bundles of light rays follow the same paths as in the embodiment 1 respectively, and then a fluorescence image is formed on the first area 3a and a white light image is formed on the second area 3b.

Besides, in observing an object using the image pickup apparatus system of the embodiment 4, an illumination optical system which is not shown in the drawings radiates white light and fluorescence. In the case where the wavelength of the fluorescence is a wavelength in the infrared region for example, the illumination optical system radiates white light and infrared exciting light to an object to be imaged. Also, in the case where the wavelength of fluorescence is a wavelength in the visible region (400 to 700 nm) for example, the illumination optical system radiates exciting light and white light in a time-division manner, through a rotation plate that is provided with an excitation filter and a transparent glass on its circumference for example.

In the image pickup apparatus system of the embodiment 4, it is possible to form two images of an image for fluorescence observation and an image for white light observation on the first and second areas 3a and 3b on one image sensor 3, the first and second areas 3a and 3b being different from each other, so that it is possible to observe each of these images on the image-displaying device 10.

Also, when a wavelength of fluorescence used for observation is in an infrared region, white light and infrared exciting light are simultaneously radiated to an object by the illumination optical system, so that it is possible to simultaneously observe an infrared fluorescence image and a white light image.

Besides, in the example shown in FIGS. 9A and 9B, a fluorescence image is formed on the first area 3a, and a white light image is formed on the second area 3b. However, the fluorescence image may be formed on the second area 3b and the white light image may be formed on the first area 3a.

The other constitutions for the embodiment 4 are the approximately same as those of the image pickup apparatus system of the embodiment 1.

Besides, image pickup apparatuses and image pickup apparatus systems according to the present invention are not limited to the structures described in the embodiments 1 to 4. For example, an image pickup apparatus or an image pickup apparatus system according to the present invention may be formed so that the image pickup apparatus or the image pickup apparatus system combines all of the structures of the embodiments 1 to 4.

Figure 10A:
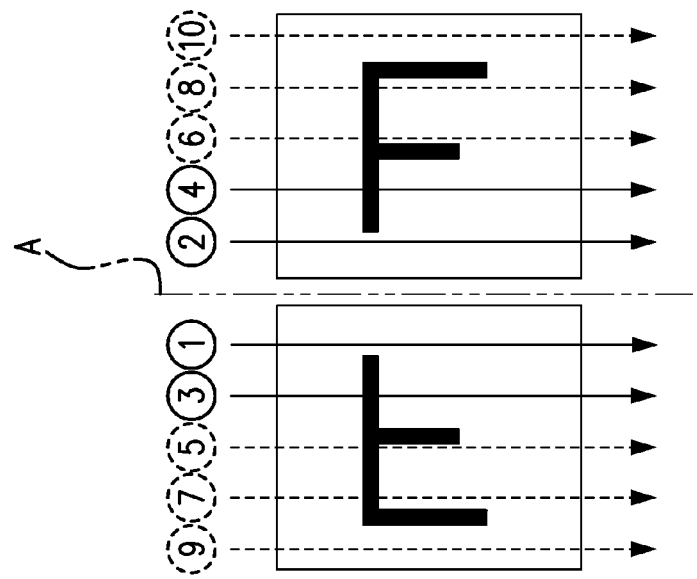
FIGS. 10A and 10B are explanatory views showing a variation example of methods of reading pixel information of image sensors out in an image pickup apparatus and an image pickup apparatus system according to the present invention.
Figure 10B:
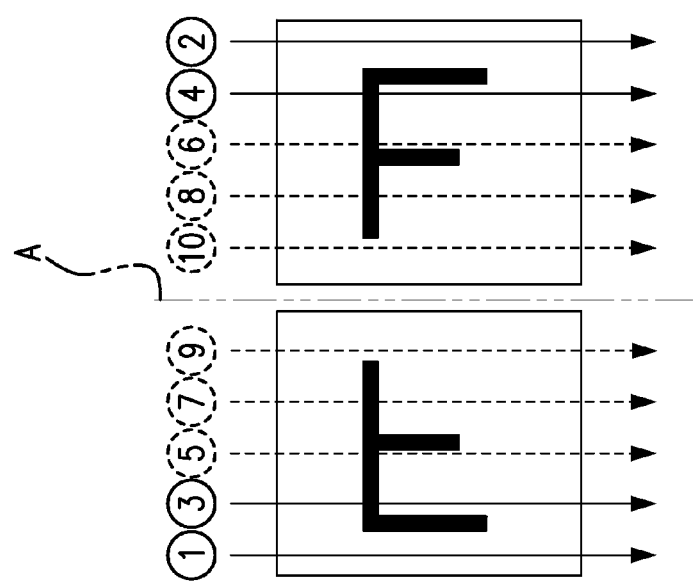
Figure 11:
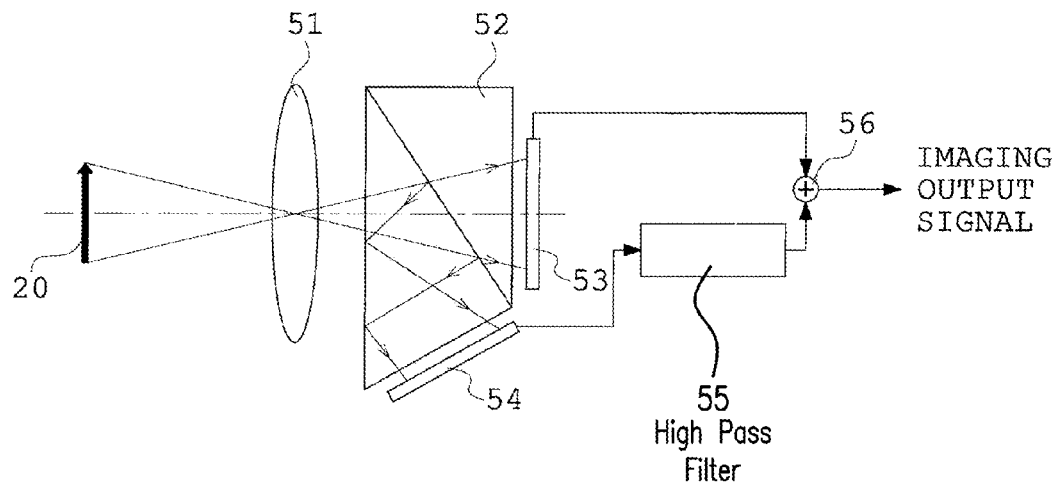
FIG. 11 is a view schematically showing a structure of the image pickup apparatus disclosed in Japanese Patent Kokai No. Hei. 09-116807.
Figure 12:
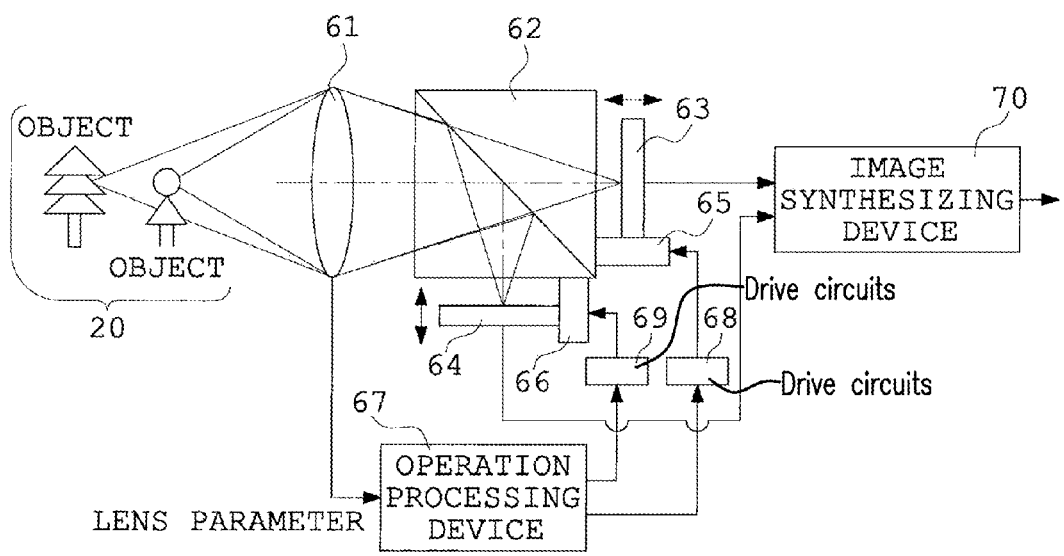
FIG. 12 is a view schematically showing a structure of the image pickup apparatus disclosed in Japanese Patent Kokai No. 2003-078802.
Figure 13:
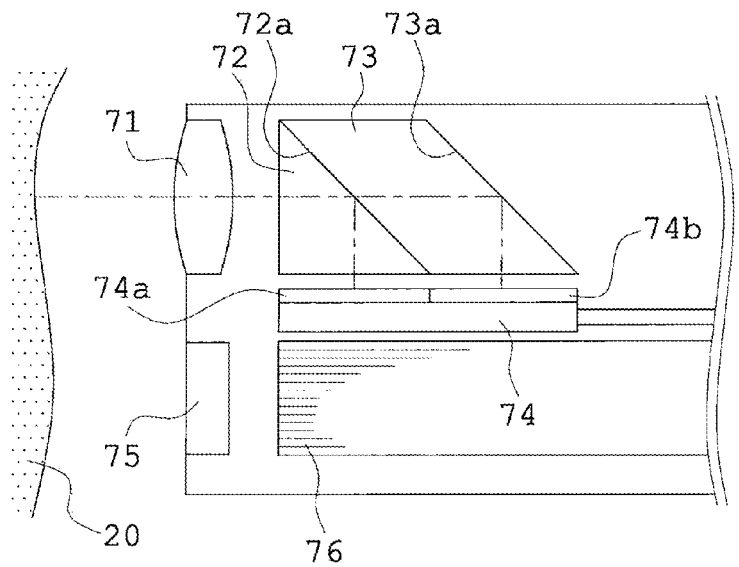
FIG. 13 is a view schematically showing an inner structure of the front portion of an electronic endoscope provided with the image pickup apparatus disclosed in Japanese Patent Kokai No. 2004-313523.
Figure 14:
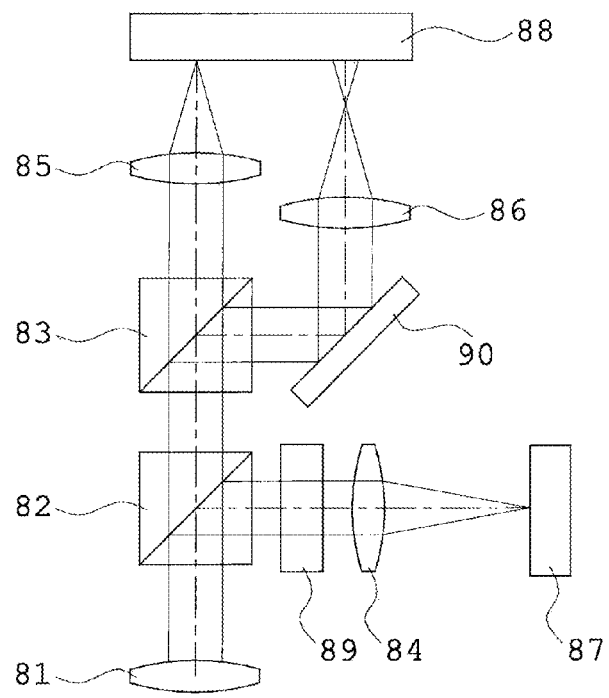
FIG. 14 is a view schematically showing a structure of the image pickup apparatus disclosed in Japanese Patent Kokai No. 2010-220890.

Also, in an image pickup apparatus and an image pickup apparatus system according to the present invention, methods of reading pixel information out as shown in FIGS. 10A and 10B may be used as a method of reading pixel information out by an image sensor.

In an image pickup apparatus or an image pickup apparatus system according to the present invention to which one of the present variation examples of methods of reading pixel information out is applied, an image sensor is formed to read pixel information out in a direction perpendicular to a direction in which images formed on first and second areas respectively align, as shown as one example in FIG. 10A and as another example in FIG. 10B. In addition, the image sensor is formed to read pixel information on an image on the first area and pixel information on an image on the second area out alternately with each other and line-symmetrically with respect to an imaginary line A halving an imaging plane of the image sensor in a direction in which the images formed on the first and second areas respectively align (for, example, the image sensor reads pixel information on an image on the first area and pixel information on an image on the second area out in numerical order of 1 to 10 shown in FIG. 10A or 10B).

In a more detailed explanation, in the example shown in FIG. 10A, the image sensor is formed to read pixel information on an image formed on the first area and pixel information on an image formed on the second area out alternately with each other and line-symmetrically with respect to the imaginary line A in such a way that the readout of the pixel information by the image sensor starts with the most distant area from the imaginary line A. Also, in the example shown in FIG. 10B, the image sensor is formed to read pixel information on an image formed on the first area and pixel information on an image formed on the second area out alternately with each other and line-symmetrically with respect to the imaginary line A in such a way that the readout of the pixel information by the image sensor starts with the nearest area to the imaginary line A.

It is possible to secure simultaneous acquisition of pixel information on an image formed on the first area and pixel information on an image formed on the second area also by the present variation example of methods of reading pixel information out by image sensors, as well as the method of reading pixel information out which is shown with an arrow in FIG. 1B.

As explained above, an image pickup apparatus and an image pickup apparatus system according to the present invention have not only the characteristics described in claims but also the following characteristics:

(1) The image pickup apparatus according to claim 1, wherein the image sensor reads out pixel information on the image formed on the first area and pixel information on the image formed on the second area in a direction perpendicular to a direction in which the image formed on the first area and the image formed on the second area align, in an alternate and line-symmetrical manner with respect to an imaginary line that halves a surface of the image sensor across the direction in which the image formed on the first area and the image formed on the second area align.

An image pickup apparatus and an image pickup apparatus system according to the present invention are useful for endoscopic observations for which observation with a deep depth of focus is needed, for example.

What is claimed is:
1. An image pickup apparatus comprising
an objective optical system for forming an image out of a bundle of light rays traveling from an object,
an image sensor placed in a vicinity of an image-forming position of the objective optical system,
a dividing element placed between the objective optical system and the image sensor and used for dividing the bundle of light rays traveling from the objective optical system into two bundles of light rays, which are a bundle of light rays reflected and a bundle of light rays transmitted,
a first reflection member for reflecting back the bundle of light rays having been reflected by the dividing element, and
a second reflection member for reflecting the bundle of light rays having been transmitted through the dividing element,
wherein the bundle of light rays having been reflected by the first reflection member via the dividing element is focused to form an image on a first area of the image sensor, and the bundle of light rays having been reflected by the second reflection member is focused to form an image on a second area of the image sensor that is different from the first area of the image sensor.

2. The image pickup apparatus according to claim 1, wherein
the dividing element is a polarizing beam splitter,
a wave plate for changing a phase of the bundle of light rays having been reflected by the polarizing beam splitter is further placed between the polarizing beam splitter and the first reflection member, and
the bundle of light rays having been reflected by the first reflection member via the wave plate and the polarizing beam splitter is focused on the first area of the image sensor, to form an image.

3. The image pickup apparatus according to claim 2, wherein the wave plate is a $\lambda/4$ plate.

4. The image pickup apparatus according to claim 1, wherein the bundle of light rays that forms an image on the first area of the image sensor and the bundle of light rays that forms an image on the second area of the image sensor are made to differ from each other in optical path length up to the image-forming position.

5. An image pickup apparatus system comprising
the image pickup apparatus according to claim 4, and
an image-selecting section that compares, with each other, the images respectively formed on the first area and the second area, from which to select an in-focus image to be displayed.

6. The image pickup apparatus according to claim 1, wherein the image sensor and the second reflection member are joined together in a vicinity of the second area, and the image sensor and the dividing element are joined together in a vicinity of the first area.

7. The image pickup apparatus according to claim 2, wherein the image sensor and the second reflection member are joined together in a vicinity of the second area, and the image sensor and the polarizing beam splitter are joined together in a vicinity of the first area.

8. The image pickup apparatus according to claim 2, wherein a depolarization plate is placed on an objective-optical-system side of the polarizing beam splitter.

9. An image pickup apparatus system comprising
the image pickup apparatus according to claim 1, and
an image-processing section capable of adjusting at least one of: white balance, shift of a central position, image rotation, and magnification; of each of the images respectively formed on the first area and the second area.

10. The image pickup apparatus according to claim 2, wherein the wave plate is configured to be rotatable so that the images respectively formed on the first area and the second area have substantially equal brightness.

11. The image pickup apparatus according to claim 1, wherein the image sensor reads out pixel information in a direction along a direction that connects a center of the first area and a center of the second area.

12. The image pickup apparatus according to claim 11, wherein a shutter method for the image sensor is a rolling shutter method in which a shutter operation is performed for each scan line.

13. The image pickup apparatus according to claim 2, wherein
the objective optical system has a first optical path and a second optical path, and
a polarization plate is placed on each of the first optical path and the second optical path so that the polarization plates make a polarization direction of a bundle of light rays travelling on the first optical path perpendicular to a polarization direction of a bundle of light rays traveling on the second optical path.

14. The image pickup apparatus according to claim 13, wherein the first optical path and the second optical path are optical paths for right eye and for left eye respectively, optical paths for direct viewing and for side viewing respectively, or optical paths for white light and for fluorescence respectively.

* * * * *